3,149,150
DIMALONONITRILES

Alexander T. Shulgin, Lafayette, Calif., assignor to The Dow Chemical Company, Midland, Mich., a corporation of Delaware
No Drawing. Filed July 28, 1961, Ser. No. 127,496
4 Claims. (Cl. 260—465.5)

This invention concerns certain new substituted malononitriles, and particularly certain alkylenebis(iminomethylidyne)dimalononitriles having a structure corresponding to the formula

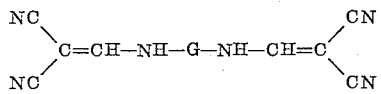

wherein G represents an alkylene radical being of from 2 to about 10, inclusive, carbon atoms. In view of the present definition, it is apparent that compounds representative of the present invention include ethylenebis(iminomethylidyne) - dimalononitrile, trimethylenebis(iminomethylidyne)dimalononitrile, propylenebis(iminomethylidyne)dimalononitrile, 1-methyl - trimethylenebis(iminomethylidyne)dimalononitrile, hexamethylenebis(iminomethylidyne)dimalononitrile, nonamethylenebis(iminomethylidyne)dimalononitrile, and decamethylenebis(iminomethylidyne)dimalononitrile, and the like.

These new compounds are colorless to near-colorless crystalline solids appearing white or off-white in mass; somewhat soluble in many common organic solvents such as, acetone, methylethyl ketone and ethyl alcohol and of very low solubility in water. They are useful as parasiticides and are adapted to be employed for the control of insects, and agricultural pests such as weeds and fungus diseases.

The new compounds are prepared by causing a reaction between an alkoxymethylenemalononitrile and an alkylenediamine corresponding to the formula

The reaction is advantageously carried out in a liquid reaction medium which may, for example, be ethanol. The reaction is moderately exothermic in at least its initial stages and initiates readily at temperatures in the range of 25°–150° C., temperatures as high as about 80°–150° C. are advantageously used to drive the reaction to completion. Representative alkanediamines to be employed include ethylenediamine, propylenediamine, trimethylenediamine, tetramethylenediamine, 5-methylnonamethylene-1,9-diamine, decamethylenediamine, and the like.

In carrying out the reaction, the alkanediamine and the alkoxymethylenemalononitrile are intimately contacted together. Preferably, the contacting is carried out in an inert solvent which may conveniently be water or a lower alkanol such as methanol, or ethanol. The reaction initiates readily with heating; therefore, the contacting of the reactants is conveniently carried out initially with heating to a reaction temperature range. Temperature ambient the reaction may conveniently be limited by the boiling temperature of solutions or suspensions thereof in most liquid reaction media. The reaction by which the present products are obtained takes place between 1 molecular proportion of the alkanediamine and 2 molecular proportions of the alkoxymethylenemalononitrile reactant. Desirably, reactants are employed in about these proportions. However, the reactants may be employed in any proportions. If employed proportions of reactants differ from the above-indicated stoichiometric proportions, in general the reactant in excess thereof will appear as an impurity in, and may be removed from, the resulting product.

Upon completion of the reaction, the resulting reaction mixture is usually filtered to separate product. Products insoluble at high temperatures may be removed by filtration hot. Also the resulting reaction mixture may be cooled to about room temperature whereupon the desired product may be separated as a solid by filtration or the like from the reaction mixture. Alternatively, the reaction mixture may be warmed under subatmospheric or atmospheric pressure to vaporize and remove liquid reaction medium and alkanol by-product of reaction, to obtain the desired product. When the desired product contains, as impurity, unreacted starting material, such material may be removed by washing with portions of solvent such as lower alkanol, for instance ethanol. The resulting product may be further purified by conventional techniques such as by washing with further portions of lower alkanol, and recrystallization from various organic solvents.

The following examples merely illustrate the present invention but are not to be construed as limiting it.

*Example 1.—Ethylenebis(iminomethylidyne) diamalononitrile*

To a solution of 10.3 grams (0.085 mole) ethoxymethylenemalononitrile in about 25 milliliters water (warm to the hand) is added as a single portion, with stirring, 3.5 grams of a 70 percent solution (0.041 mole) ethylenediamine. An exothermic reaction takes place at once and the temperature of the resulting reaction mixture rises to about 50° C. The resulting mixture is then heated at the boiling temperature (about 100° C.) for about 20 minutes to carry the reaction to completion. The resulting mixture contains the desired product as a solid: by hot filtration the product is removed and thereafter air dried, to obtain 4.5 grams (0.02 mole) of an ethylenebis(iminomethylidyne)dimalononitrile product as a creamy white solid melting with decomposition at 228° C. The product had, upon analysis, 39.39 percent nitrogen by weight as compared with theoretical value of 39.61 percent. Yield was 50 percent of theoretically perfect based upon starting materials.

The compound ethylenebis(iminomethylidyne)dimalononitrile is distinctly and specifically toxic to fungi and, when formulated with adjuvant substances as a water spray, was highly effective in protecting young tomato plants from subsequent infestation by inoculation with live spores of tomato early blight.

*Example 2.—Decamethylenebis(iminomethylidyne)- dimalononitrile*

In procedures essentially the same as the foregoing except that the employed diamine reactant is decamethylenediamine melting at about 60° C., there is prepared a decamethylenebis(iminomethylidyne)dimalononitrile product as an off-white crystalline solid. The compound has a nitrogen content of 25.9 percent by weight, and a molecular weight of 324.4.

*Example 3*

In procedures essentially the same as the foregoing except that the employed reaction medium is a mixture of n- and isopropanol, there is prepared a 1,3-butylenebis(iminomethylidyne)dimalononitrile by the reaction of 1-methyltrimethylenediamine and ethoxymethylenemalononitrile. The compound has the appearance of pale tan flaky crystals that decompose without distinctly melting: the compound is toxic to proliferating spores of fungi. It has a molecular weight of 240.3 and a nitrogen content of 34.6 percent by weight.

The new compounds of the present invention have been found to be useful as parasiticides and are adapted to be employed for the control of various pests. For use, the products may be dispersed on inert finely divided solids and employed as dusts. Also, such mixtures may be dispersed in water with the aid of a wetting agent and the resulting aqueous suspensions used as sprays. In other procedures, the products may be employed in oil, as oil-in-water emulsions, or water dispersions with or without the aid of dispersing or emulsifying agents. In a representative operation, the application as a thorough wetting spray to young tomato plants of a composition containing ethylenebis(iminomethylidyne)dimalononitrile at the rate of one half pound per hundred gallons of ultimate composition afforded commercially satisfactory protection against subsequent inoculation with viable spores of the fungus *Alternaria solani* whereas plants similarly inoculated with the fungus but without protection from the present compound were uniformly and heavily infested.

I claim:

1. An alkylenebis(iminomethylidyne)dimalononitrile having a structure corresponding to the formula $$\begin{array}{c} NC \\ NC \end{array} C=CH-NH-G-NH-CH=C \begin{array}{c} CN \\ CN \end{array}$$

wherein G is an alkylene group being of from 2 to about 10, inclusive, carbon atoms.

2. Ethylenebis(iminomethylidyne)dimalononitrile.
3. 1,3-butylenebis(iminomethylidyne)dimalononitrile.
4. A method of preparing an alkylenebis(iminomethylidyne)dimalononitrile corresponding to the formula $$\begin{array}{c} NC \\ NC \end{array} C=CH-NH-G-NH-CH=C \begin{array}{c} CN \\ CN \end{array}$$

wherein G is a alkylene group being of from 2 to about 10, inclusive, carbon atoms, which comprises the step of causing a reaction between an alkoxymethylenemalononitrile and an alkanediamine corresponding to the formula $$H_2N-G-NH_2$$

wherein G has the value previously stated.

References Cited in the file of this patent

UNITED STATES PATENTS 2,783,267    Lotz                 Feb. 26, 1957
2,928,831    Surry                Mar. 15, 1960